(12) United States Patent
Wu

(10) Patent No.: US 7,097,487 B2
(45) Date of Patent: Aug. 29, 2006

(54) FIXTURE FOR AN EMBEDDED UNIT OF AN ELECTRONIC DEVICE

(75) Inventor: Yaz-Tzung Wu, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/038,110

(22) Filed: Jan. 21, 2005

(65) Prior Publication Data

US 2006/0166543 A1 Jul. 27, 2006

(51) Int. Cl.
*H01R 13/62* (2006.01)

(52) U.S. Cl. .................................... 439/299; 439/911
(58) Field of Classification Search ............... 439/299, 439/300, 347, 911
See application file for complete search history.

(56) References Cited

U.S. PATENT DOCUMENTS 6,261,123 B1 * 7/2001 Kruger et al. .............. 439/511
6,280,211 B1 * 8/2001 Tateishi ..................... 439/131
6,439,917 B1 * 8/2002 Tonozuka ................... 439/372
6,494,728 B1 * 12/2002 Gorman ..................... 439/140
6,817,882 B1 * 11/2004 Bauer et al. ................ 439/347
6,913,473 B1 * 7/2005 Schmid et al. .............. 439/136

* cited by examiner

*Primary Examiner*—Khiem Nguyen
(74) *Attorney, Agent, or Firm*—Bacon & Thomas, PLLC

(57) ABSTRACT

The present invention is to provide a fixture for an embedded unit of an electronic device, which includes a casing having a first slot disposed at the surface on one side thereof; a latch member being movably coupled to the casing corresponding to the first slot and extended into the casing from the first slot; an accommodating groove being disposed on another side of the first slot; an embedded unit being embedded precisely into the accommodating groove and having an corner indent section proximate to the first slot for accommodating the latch member, and the embedded unit has an embedded section being disposed proximate to the corner indent section and latched to the latch member so as to mount the embedded unit into the casing. If the latch member is removed, then the embedded unit can be removed from the casing.

6 Claims, 3 Drawing Sheets

FIXTURE FOR AN EMBEDDED UNIT OF AN ELECTRONIC DEVICE

BACKGROUND OF THE INVENTION

1. Field of the Invention

The present invention generally relates to fixtures, and more particularly to a fixture for fixing an embedded unit of an electronic device.

2. Description of Related Art

As our life has entered into an information era and the electronic industry is blooming, various high-tech products and electronic equipments derived from the computer are developed in a very fast pace, and thus bring tremendous convenience to our daily life. However, the current electronic technology is developed rapidly and advances unceasingly and the concept for developing related electronic products such as a notebook computer tends to have a light, thin, short and compact design to meet the portable requirements. Major notebook computer manufacturers continue their research and development and intend to reduce the weight and thickness of the notebook computers, and the design of components in various technological areas tends to be a structure that can be install or removed in a quick, simple and easy way, so that an operator at an assembly line can install a component to a main system quickly to save the manufacturing time and cost. Furthermore, such design also makes the maintenance work of an electronic device very easy for maintenance people, since the design allows assembly workers or end-users to remove any component from the main system easily without using a tool. The design concept of this sort becomes very popular for major technological companies to meet their actual needs and further developments and improvements in the related area are made by these companies.

However, an embedded component (such as an optical disk drive, and a hard disk drive, etc) is generally installed in a notebook computer and fixed onto a retaining base (such as a chassis) of the notebook computer, and the embedded component is usually fixed onto the retaining base by means of securing a plurality of screws into a plurality of through holes of the embedded component to prevent the embedded unit and the retaining base from being separated with each other.

In another way of mounting the embedded unit, at least one fixing latch is movably coupled to the embedded unit. When the embedded unit is installed to the retaining base (such as a chassis), the fixing latch will be extended into the retaining base to support and mount the embedded unit.

In a further way of mounting the embedded unit, a groove (or a sliding track) is disposed at the embedded unit and the retaining base includes a sliding track (or groove) corresponding to the groove (or sliding track) respectively. With the installation of the sliding tracks and grooves, the embedded unit is embedded into the retaining base such that the embedded unit cannot be moved or shifted easily.

However, it is necessary to install a special component between the retaining base and the embedded unit according to the aforementioned prior art for mounting the embedded unit onto the retaining base. Such structural design definitely wastes lots of materials and manufacturing costs, and also uses more internal spaces of the notebook computer and thus leaves smaller space of the expansion of a notebook computer. In the meantime, the prior art also wastes the user's time to remove the embedded unit and thus causing inconvenience and trouble to its use.

SUMMARY OF THE INVENTION

To overcome the shortcomings of the forging prior art, the inventor of the present invention based on years of experience in the related field to conduct extensive researches and experiments and finally invented a fixture for an embedded unit of an electronic device in accordance with the present invention.

It is a primary objective of the present invention to provide a fixture for an embedded unit of an electronic device that comprises a casing having a first slot disposed at the surface on one side of the casing; a latch member being movably coupled to the casing at a position corresponding to the first slot, and the latch member can be extended into the casing from the first slot; an accommodating groove being disposed on another side of the first slot on the casing; an embedded unit being embedded into the accommodating groove precisely and having a corner indent section proximate to the first slot for accommodating the latch member, and the embedded unit includes an embedded section being disposed proximate to the corner indent section and latched onto the latch member so as to mount the embedded unit into the casing. If the latch member is removed, then the embedded unit can be removed from the casing.

The above and other objects, features and advantages of the present invention will become apparent from the following detailed description taken with the accompanying drawings.

DETAILED DESCRIPTION OF THE PREFERRED EMBODIMENTS

Figure 1:
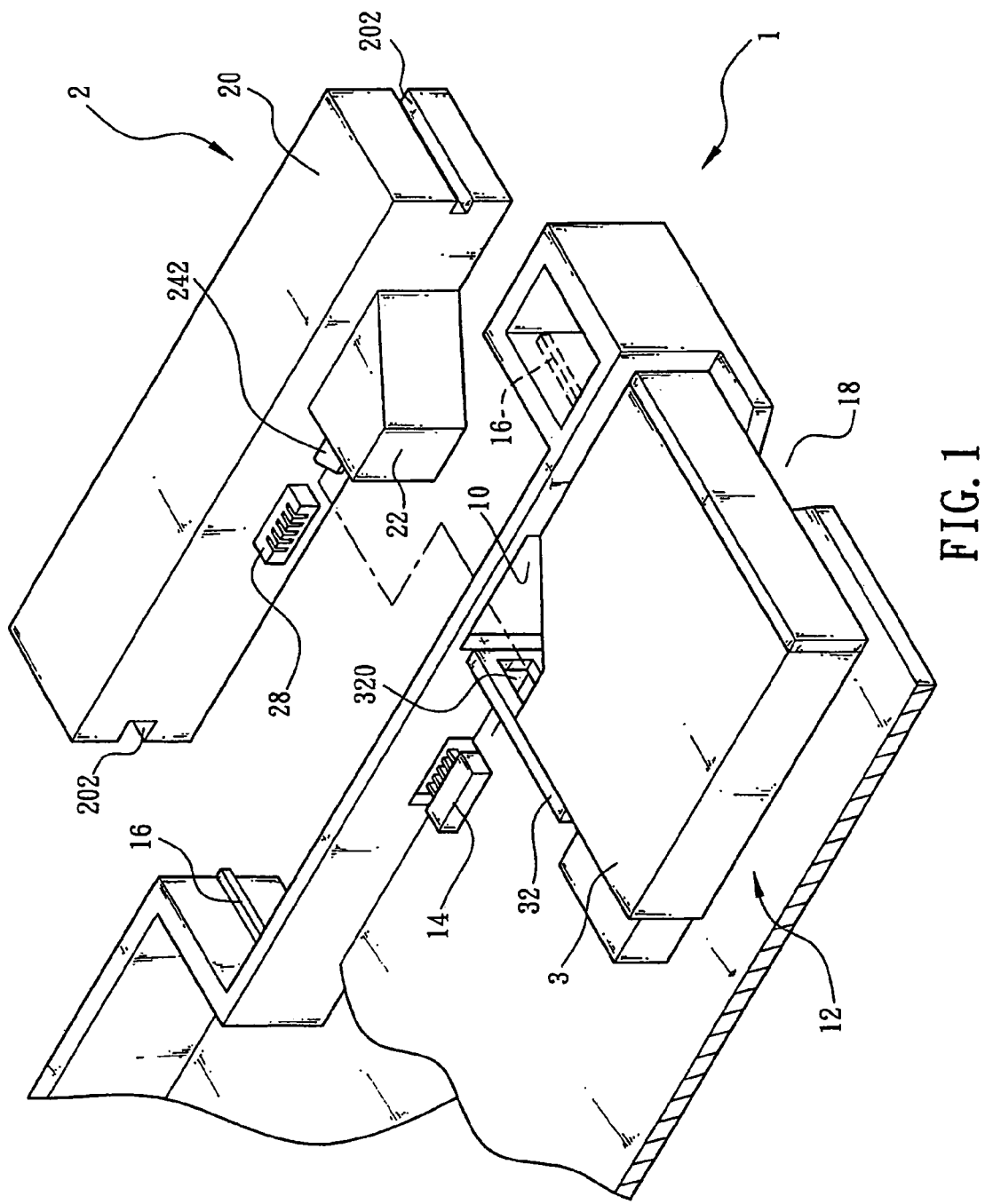
FIG. 1 is a schematic view of the structure of the present invention.
Figure 3:
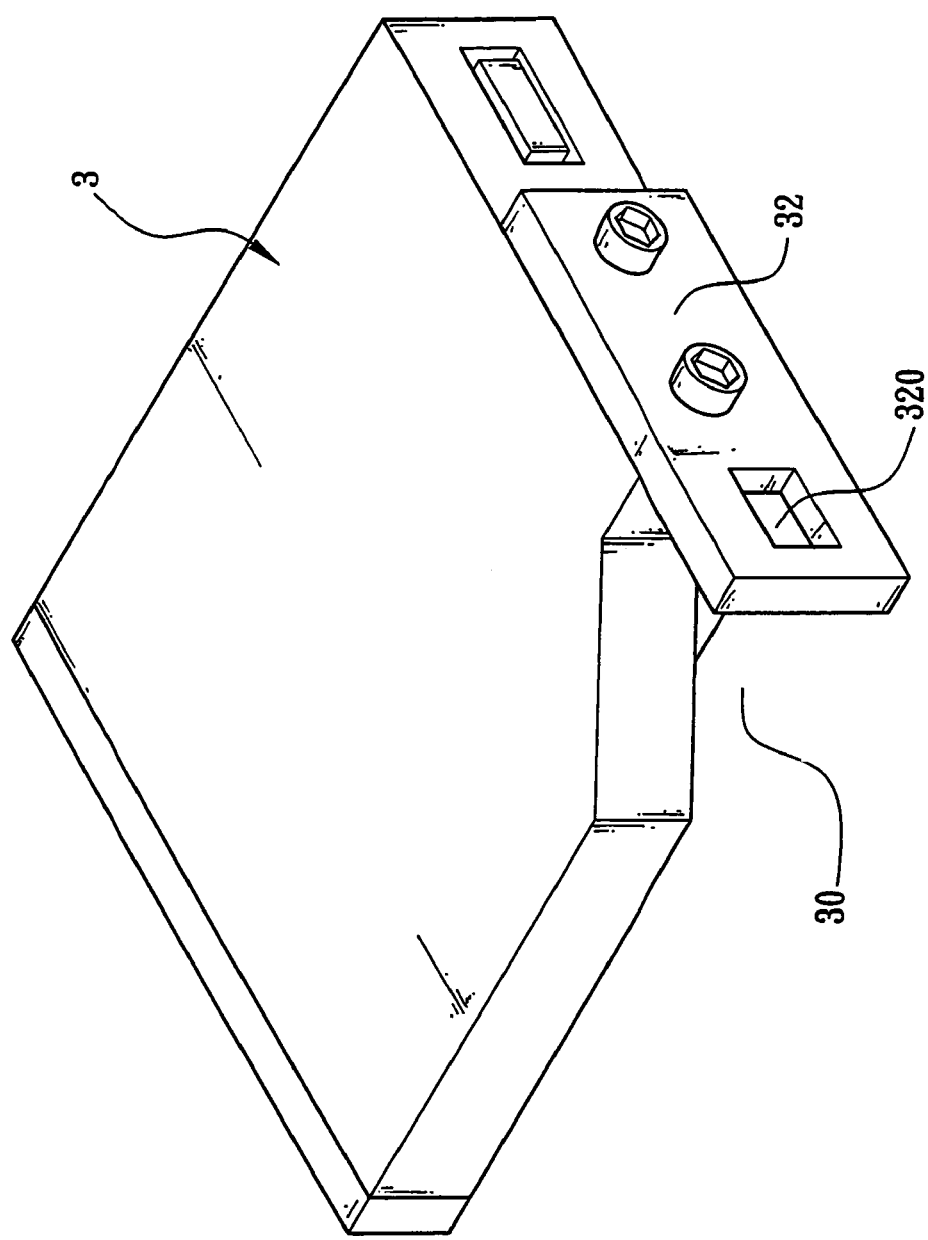
FIG. 3 is a schematic view of the structure according to another preferred embodiment of the present invention.

With reference to FIG. 1, the present invention discloses a fixture for an embedded unit of an electronic device, which comprises a casing 1 having a first slot 10 disposed at a surface on a lateral side of the casing 1. The casing 1 has a latch member 2 movably disposed thereon at a position corresponding to the first slot 10 and the latch member 2 has at least one part to be extended into the casing 1 from the first slot 10. The casing 1 has an accommodating groove 12 disposed on another side of the first slot 10 of the casing 1. The accommodating groove 12 has an embedded unit 3 embedded therein. The embedded unit 3 (such as an optical disk drive) has a corner indent section 30 (as shown in FIG. 3) proximate to the first slot 10. The corner indent section 30 is provided for accommodating a part of the latch member 2 to be extended into the casing 1, and the embedded unit 3 has an embedded section 32 on the embedded unit 3 at a position proximate to the corner indent section 30. Please refer to FIG. 3, a part of the latch member 2 is extended into the casing and latched on the embedded section 32, such that the embedded unit is mounted into the casing 1. If the latch member 2 is removed, the embedded unit 3 can be removed from the casing 1.

Figure 2:
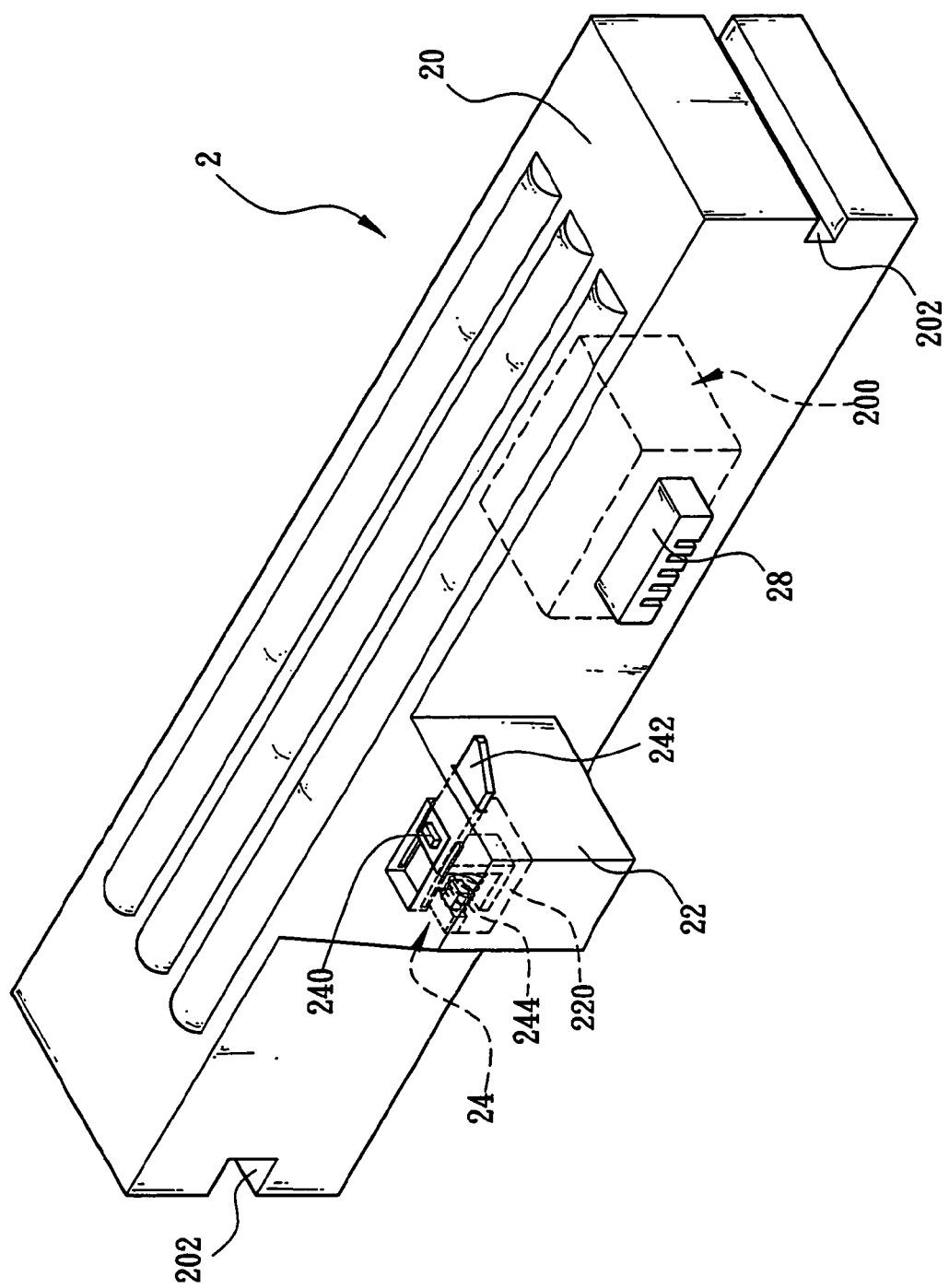
FIG. 2 is a schematic view of the structure according to a preferred embodiment of the present invention.

Please refer to FIG. 2 for a preferred embodiment of the present invention. The latch member 2 has a main body 20, and the latch member 2 has a protrusion 22 disposed on the main body 20 on a side facing the first slot 10. The protrusion 22 is constructed on the main body 10 facing the first slot 10, and the protrusion 22 has an accommodating space 220, and the accommodating space 220 includes a movable section 24. The movable section 24 can freely move, extend or retract, and is movably coupled to the embedded section 32, so that the protrusion 22 can be extended into the casing 1 from the first slot 10 and embedded into the corner indent section 30. In the process of extending the protrusion 22 into the casing 1, the movable section 24 is retracted into the accommodating space 220 first, and the movable section 24 facing an opening 320 is disposed on the embedded section 32, and the movable section 24 is latched into the opening 320, such that the latch member 2 is securely coupled to the embedded unit 3 (as shown in FIG. 1).

Please refer to FIG. 2 for the preferred embodiment of the present invention again. The movable section 24 has a push plate 240 and a movable member 242, and the push plate 240 are disposed on a lateral surface of the protrusion 22, and the movable member 242 is disposed on the protrusion 22 facing a side of the opening 320, and one part of the movable member 242 can be movably projected out from the accommodating space 220 or retracted into the accommodating space 220. The movable member 242 is coupled to the push plate 240, such that the movable member 242 can move according to the push plate 240. Further, the movable section 24 has a resilient member 244 disposed between the movable member 242 and the push plate 240. The resilient member has an accommodating space 220 disposed between the movable member 242 and the push plate 240 in the accommodating space 220. One end of the resilient member 244 is fixed to the push plate 240 and the other end is fixed to the movable member 242. The movable member 242 allows a part to be exposed from the protrusion 22 by the resilient member 244 or retracts the movable member 242 into the accommodating space 220 by an external force, such that in the process of extending the protrusion 22 into the casing 1, the movable member 242 is compressed by a lateral side of the first slot 10 (as shown in FIG. 2) proximate to the casing, and the movable member gradually retracts into the accommodating space 220. When the movable member 242 faces the opening 320 precisely, the movable member 242 will be extended into the opening 320 by a resilient force of the resilient member 244 so as to securely couple the latch member 2 and the embedded unit 3.

Please refer to FIG. 2 for the preferred embodiment of the present invention again. The main body 20 has an expansion unit 200 (such as a wireless communication module or a battery charger). The main body 20 has a connector 28 disposed at a position proximate to the protrusion 22. When the latch member 2 is coupled to the casing 1 (as shown in FIG. 1), the connector 28 is coupled precisely to another connector 14 in the casing 1, such that the expansion unit 200 can transmit signals to an electronic device installed in the casing 1.

With reference to FIG. 2 again, the main body 20 has a first sliding section 202 (such as a sliding groove) disposed on both sides of the main body 20, and the casing 1 has a second sliding section 16 (as shown in FIG. 1) disposed at a position corresponding to the first sliding section 202, such that the main body 20 can be secured onto the casing 1. In FIG. 2, the casing has a second slot 18 disposed in the casing 1 at an end proximate to the accommodating groove 12 for facilitating users to remove the embedded unit 20 from the second slot 18.

Although the present invention has been explained in relation to its preferred embodiment, it is to be understood that many other possible modifications and variations can be made without departing from the spirit and scope of the invention as hereinafter claimed.

What is claimed is:

1. A fixture for an embedded unit of an electronic device, comprising:
   a casing, having a first slot disposed on a surface at one side of said casing;
   a latch member, having at least one part to be extended into said casing from said first slot, and an accommodating groove being disposed on said casing on another side of said first slot;
   an embedded unit, being embedded into said accommodating groove and having a corner indent section proximate to said first slot, and an embedding section disposed proximate to said corner indent section, such that at least one part of said latch member being accommodated in said corner indent section and latched onto said embedding section so as to mount said embedded unit and said latch member into said casing.

2. The fixture of claim 1, wherein said latch member comprises:
   a main body;
   a protrusion, being disposed on said main body facing a side of said first slot and embedded into said corner indent section, and said protrusion having an accommodating space; and
   a movable section, being disposed in said accommodating space of said protrusion and movably coupled to said embedding section.

3. The fixture of claim 2, wherein said movable section comprises:
   a movable member, being disposed in said accommodating space and one section of said movable member capable of movably projecting out from said accommodating space and retracting into said accommodating space;
   a push plate, being disposed on a lateral surface of said protrusion and coupled to an end of said movable member for movably extending and retracting said movable member;
   a resilient member, being disposed between said movable member in said accommodating space and said push plate and pushing said movable member out from the surface of said protrusion by a resilient force or retracting said movable member into said accommodating space by an external force.

4. The fixture of claim 2, wherein said main body includes an expansion unit and connector disposed proximate to said protrusion, such that said connector is capable of coupling another connector in said casing.

5. The fixture of claim 2, wherein said main body comprises a first sliding section disposed on both sides each and a second sliding section disposed on said casing corresponding to said first sliding section, such that said main body is securely mounted onto said casing by said first sliding section and said second sliding section.

6. The fixture of claim 1, wherein said casing comprises a second slot disposed on an end of said accommodating groove.

* * * * *